United States Patent
Sambhy et al.

(10) Patent No.: US 9,676,962 B2
(45) Date of Patent: Jun. 13, 2017

(54) ANTI-WETTING, LOW ADHESION COATINGS FOR AQUEOUS INK PRINTHEADS

(71) Applicant: XEROX CORPORATION, Norwalk, CT (US)

(72) Inventors: Varun Sambhy, Pittsford, NY (US); Kyle B. Tallman, Perry, NY (US); Santokh S. Badesha, Pittsford, NY (US); Michael S. Roetker, Webster, NY (US); Jonathan H. Herko, Walworth, NY (US); Scott J. Griffin, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/535,874

(22) Filed: Nov. 7, 2014

(65) Prior Publication Data

US 2016/0130469 A1     May 12, 2016

(51) Int. Cl.
*B41J 2/01* (2006.01)
*C09D 175/08* (2006.01)
(Continued)

(52) U.S. Cl.
CPC .......... *C09D 175/08* (2013.01); *B41J 2/1606* (2013.01); *B41J 2/2107* (2013.01); *C08G 18/246* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101;
(Continued)

(56) References Cited

U.S. PATENT DOCUMENTS 5,364,697 A    11/1994  Miyabayashi
6,534,128 B1 *  3/2003  Carlson et al. ................ 347/1
(Continued)

FOREIGN PATENT DOCUMENTS

| JP | 01267255 A | 10/1989 |
| JP | 07196224 A | 8/1995 |
| JP | 2009235151 A | 10/2009 |
| WO | 2015/142558 A1 | 9/2015 |

OTHER PUBLICATIONS

LeFevre et al., "Anti-Contamination Coating for Decurler Indenting Shaft", U.S. Appl. No. 14/841,096, filed Aug. 31, 2015.

*Primary Examiner* — Manish S Shah
(74) *Attorney, Agent, or Firm* — MH2 Technology Law Group LLP

(57) ABSTRACT

Exemplary embodiments provide anti-wetting, low adhesion coatings for use with aqueous ink jet printheads. Exemplary embodiments directed to aqueous ink jet printheads with the anti-wetting, low adhesion coating on the front face thereof and methods for reducing drooling, wetting or adhesion on a front face of an ink jet printhead configured for ejecting aqueous ink are also described.

6 Claims, 9 Drawing Sheets

(51) Int. Cl.
*B41J 2/21* (2006.01)
*C08G 18/50* (2006.01)
*C08G 18/79* (2006.01)
*C08G 18/24* (2006.01)
*B41J 2/16* (2006.01)

(52) U.S. Cl.
CPC ....... *C08G 18/5015* (2013.01); *C08G 18/792* (2013.01)

(58) Field of Classification Search
CPC ....... C09D 11/005; C09D 11/54; C09D 11/52; B41M 5/0011; B41M 5/0017; B41M 7/00; B41M 7/0072; B41M 5/52; B41M 5/5218
USPC ....... 347/100, 95, 96, 101, 102, 103, 88, 21, 347/20, 99, 105; 106/31.6, 31.27, 31.13; 523/160, 161
See application file for complete search history.

(56) References Cited

U.S. PATENT DOCUMENTS

| | | |
|---|---|---|
| 7,897,678 B2 | 3/2011 | Qiu |
| 8,192,005 B2 | 6/2012 | Law et al. |
| 8,544,987 B2 | 10/2013 | Sambhy et al. |
| 2003/0234846 A1* | 12/2003 | Koga ................... B41M 5/0035 347/100 |
| 2008/0008838 A1 | 1/2008 | Arpac et al. |
| 2011/0122210 A1 | 5/2011 | Sambhy et al. |
| 2012/0039648 A1 | 2/2012 | Sambhy et al. |
| 2012/0044298 A1* | 2/2012 | Sambhy et al. ................ 347/45 |
| 2012/0062666 A1 | 3/2012 | Roof et al. |
| 2012/0062667 A1 | 3/2012 | Roof et al. |
| 2012/0156510 A1 | 6/2012 | Okafuji et al. |
| 2012/0314012 A1 | 12/2012 | Roof et al. |
| 2013/0084458 A1 | 4/2013 | Yamada et al. |
| 2013/0096254 A1* | 4/2013 | Sambhy ................ B41J 2/1606 427/379 |

* cited by examiner

ANTI-WETTING, LOW ADHESION COATINGS FOR AQUEOUS INK PRINTHEADS

BACKGROUND

In many ink printheads, the aperture plate and jet stacks typically consist of stainless steel plates. The aperture plate has an array of small holes, or nozzles, also sometimes referred to as jets, through which the ink exits the jet stack. Stainless steel aperture plates and other plates in the jet stack are being replaced with flexible, polymer layers such as polyimide. In some instances, the polyimide film receives an anti-wetting coating, is bonded to a stainless steel aperture plate, and then a laser ablates the array of apertures into the polyimide film.

Drooling apertures or nozzles, wetting and adhesion of ink on the printhead front face lead to missing and misdirectional jetting along with poor image quality. Drooling nozzles weep ink when the internal pressure of the printhead exceeds a particular pressure, typically measured in inches of water. The higher pressure the nozzles can maintain without weeping leads to higher jetting latitude and improved performance. Wetting occurs when the front face of the printhead remains wet after printing. This ink that remains on the printhead can block the nozzles resulting in missing nozzles and misdirectional printing. FIG. 1 shows a photograph of such a contaminated printhead.

Currently, one approach to overcome these issues is to use an active cleaning blade system. Typically, these wiper blades are used only in two circumstances: when missing jets are detected and after a power-down when the ink has frozen, shrunk, and drawn air into the system. The system purges ink from the printhead and a wiper blade then wipes the ink off the front face. The ink purge expels contamination, trapped air and clears the nozzles, and then the wipers clean off the front face. With an expected printhead lifetime of 6 years, daily purges will require roughly 2000 purge and wipe cycles. This increase in wipes means that any anti-wetting coating will have to survive and maintain their beneficial properties for over 2000 cycles.

The anti-wetting coating must also have a high contact angle to maintain adequate drool pressure and a low slide angle to maintain an easy clean/self clean feature. This will lead to printhead cartridges with low or no maintenance, high engine reliability and low run cost. The stack manufacturing process generally involves high temperatures and pressures, so the coating must maintain these properties under these conditions, typically 290° C. and 350 psi for approximately 30 minutes. Generally low-adhesion anti-wetting coatings having a low slide angle have shown to slide off the printhead front face cleanly under gravity.

Oleophobic, low adhesion surface coatings for solid inks have provided significant performance improvements. Oleophobic low adhesion anti-wetting coatings disposed on polyimide aperture plate prototypes have been shown to enable high drool pressure and self/easy clean feature with solid inks.

However, while such coatings have been beneficial for use with solid inks, developing low adhesion anti-wetting surface coatings for aqueous inks is a particularly challenging task. Most aqueous inks have a complicated chemistry and include components like surfactants. Due to the surfactants, aqueous inks tend to wet most surfaces. In fact, even hydrophobic, high water contact angle surfaces are wetted by aqueous inks. Wetting printhead aperture plate surfaces leads to drooling or low drool pressure resulting in failure. Also, printhead maintenance requirements result in a higher and longer ink-anti-wetting coating contact than in solid inks e.g. due to capping of heads during off times to prevent ink drying. To date, only a very few polymers can achieve a robust aqueous ink anti-wetting coating. Hence, the development of further robust anti-wetting coatings for aqueous inks is needed.

SUMMARY

According to various embodiments, the present teachings include a coating for an aqueous ink jet printhead front face. The coating comprises a perfluoropolyether diol compound comprising an ethyoxylated spacer and a triisocyanante. Further, the coating includes anti-wetting and anti-adhesion properties wherein a drop of aqueous ink exhibits a sliding angle of about 30° or less and a contact angle of about 40° or greater with a surface of the anti-wetting, low adhesion coating.

According to various embodiments, the present teachings also include an ink jet printhead configured for ejecting aqueous ink. In embodiments, a front face of the ink jet printhead has an anti-wetting, low adhesion coating disposed on a surface, wherein a jetted drop of aqueous ink exhibits a low sliding angle and a high contact angle with the printhead front face surface having the coating, wherein the low sliding angle is about 30° or less and the contact angle is about 40° or greater.

In addition, various embodiments include a method for reducing drooling, wetting or adhesion on a front face of an ink jet printhead configured for ejecting aqueous ink. The method includes disposing an anti-wetting, low adhesion coating onto a surface of the ink jet front face, ejecting a drop of an aqueous ink including a surfactant from the printhead, wherein the aqueous ink drop exhibits a contact angle of 40° or greater and a sliding angle of about 30° or less with a surface of the coating.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
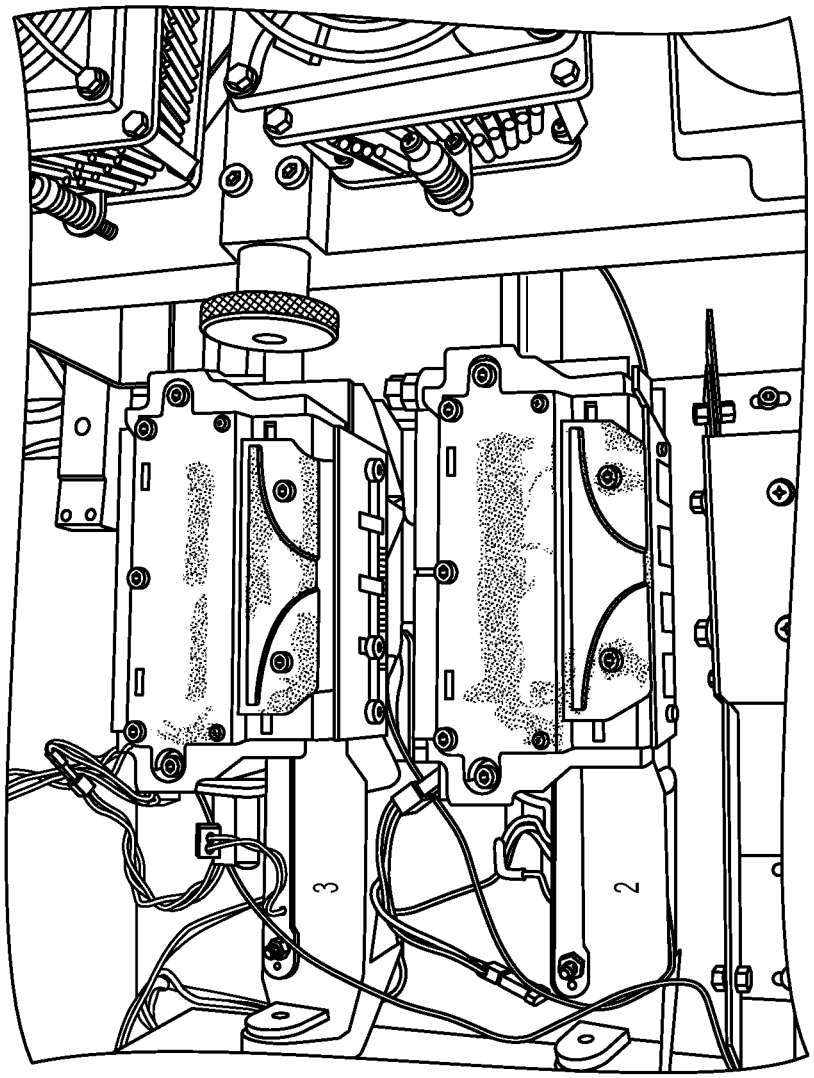
FIG. 1 shows an example of a contaminated front face of a printhead.

It should be noted that some details of the figures have been simplified and are drawn to facilitate understanding of the embodiments rather than to maintain strict structural accuracy, detail, and scale.

DETAILED DESCRIPTION OF THE EMBODIMENTS

Embodiments described herein include those directed to anti-wetting, low adhesion surface coatings and aqueous ink jet printheads having a front face coated with an anti-wetting, low adhesion surface coating. When an aqueous ink jet printhead front face is coated with the polymeric surface coating as described, jetted drops of aqueous ink surprisingly exhibit low adhesion and sufficiently low wettability towards the surface coating as determined, for example, by sliding angle and contact angle. Ink weeping (drooling) out of nozzle openings of the ink jet printheads may also be surprisingly reduced. Embodiments also include methods for reducing wetting, adhesion or drooling on a front face of an ink jet printer configured for ejecting aqueous ink.

Properties of Anti-Wetting Low Adhesion Coatings

The coatings described herein, which may be used with aqueous ink jet printheads, such as piezoelectric or thermal printheads, allow for jetted drops of aqueous ink to exhibit low adhesion towards the coating. The adhesion of an ink drop towards a surface can be determined by measuring the sliding angle of the aqueous ink drop, where the sliding angle is the angle at which a surface is inclined relative to a horizontal position when the ink drop begins to slide over the surface without leaving residue or stain behind. The lower the sliding angle, the lower the adhesion between the ink drop and the surface.

The phrase "low adhesion" as used herein means a low sliding angle of about 35° or less when measured with aqueous inks, with the anti-wetting, low adhesion coated printhead front face surface. In some embodiments, a low sliding angle is about 30° or less. In other embodiments, the low sliding angle is about 25° or less or about 20° or less when measured with aqueous inks with the anti-wetting, low adhesion coated printhead front face surface. In yet other embodiments, a low sliding angle is about 1° or greater when measured with aqueous inks, with the anti-wetting, low adhesion coated printhead front face surface.

The anti-wetting, low adhesion surface coating described herein can also exhibit a "sufficiently low wettability" with respect to the aqueous inks that are ejected from an ink jet printhead when a contact angle between an ink and the low adhesion coating is, in one embodiment, about 40° or greater and in another embodiment is about 55° or greater. In some embodiments, jetted drops of aqueous ink exhibit a contact angle of about 65° or greater. In one embodiment, there is no upper limit to the contact angle exhibited between the jetted drops of aqueous inks and the surface coating. In another embodiment, the jetted drops of aqueous ink exhibit a contact angle of about 150° or less.

In some embodiments, the high contact angle and non-wetting properties of the coatings described herein are retained even against aqueous inks containing surfactants. Due to the presence of surfactants, aqueous inks tend to wet most surfaces, even hydrophobic, high water contact angle surfaces. This is a surprising and beneficial property of the embodiments of the anti-wetting, low adhesion surface coatings described herein.

In other embodiments, a contact angle of about 40° or greater is observed even when the coating surface is fouled with, for example, dry aqueous ink. Further, the anti-wetting, low adhesion surface coating can have a long performance life, such as the ability to maintain performance after being submerged in 40° C. ink for up to 2 days.

In embodiments, the anti-wetting, low adhesion surface coatings are thermally stable, thereby providing a low sliding angle in a range from about 1° to about 30°, and a high contact angle from about 40° to about 150° even after exposure to high temperature and pressure. Examples of such high temperatures are those in a range from about 180° C. to about 325° C., such as about 290° C. Examples of high pressures are those in range from about 100 psi to about 400 psi for extended periods of time, in a range from about 10 minutes to about 2 hours, or high pressures from about 300 psi to about 350 psi for about 30 minutes.

The fabrication of high density piezoelectric printheads, for example, requires a high temperature, high pressure adhesive bonding step. Hence, it is desirable for a front face coating to withstand these high temperature and high pressure conditions. The stability of the anti-wetting, low adhesion surface coating described herein at high temperatures and high pressures is compatible with current printhead manufacturing processes.

For example, the anti-wetting, low adhesion coating may be coated onto a polyimide substrate of an aqueous ink jet printhead and bonded to a stainless steel aperture brace at high temperature and high pressure without any degradation. Therefore the resulting printhead can prevent ink contamination because ink droplets can roll off the printhead front face, leaving behind no residue.

In some embodiments, the anti-wetting, low adhesion surface coatings are able to maintain a high drool pressure. Generally, the greater the aqueous ink contact angle the better, meaning the higher the drool pressure. Drool pressure relates to the ability of the aperture plate to avoid ink weeping out of the nozzle opening when the pressure of the ink tank or the reservoir increases. Maintaining a higher pressure without weeping allows for faster printing when a print command is given. In some embodiments, the anti-wetting, low adhesion surface coating described herein can reduce drooling by increasing the drool pressure. In some embodiments, the drool pressure may be about 1.5 inches of water or greater. In other embodiments, the drool pressure may be about 2, about 3 or about 4 inches of water or greater.

In yet another embodiment, the invention may include methods for reducing drooling, wettability or adhesion on a front face of an ink jet printhead configured for ejecting aqueous inks by disposing an anti-wetting low adhesion coating as described herein onto a surface of an ink jet front face. In some embodiments, drooling is reduced when a drop of an aqueous ink, optionally comprising surfactants, exhibits a contact angle of about 40° or greater and a sliding angle of about 30° or less.

Composition and Preparation Methods of the Anti-Wetting, Low Adhesion Coatings

In some embodiments, the anti-wetting, low adhesion surface coating described herein is a reaction product of a reactant mixture that includes at least one triisocyanate and a perfluoropolyether diol compound comprising an ethoxylated spacer.

Suitable triisocyanates include polymeric isocyanates such as those having the general formula:

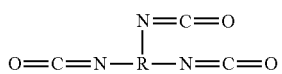

wherein R is an alkyl group, an alkylene group, an aryl group, an arylene group, an arylalkyl group, an arylalkylene group, an alkylaryl group or an alkylarylene group.

In one embodiment, R is an alkyl or an alkylene group including linear and branched, saturated and unsaturated, cyclic and acyclic, and substituted and unsubstituted alkyl and alkylene groups, and wherein heteroatoms, such as oxygen, nitrogen, sulfur, silicon, phosphorus, or the like either may or may not be present in the alkyl or alkylene group.

In one embodiment, the alkyl or alkylene group has at least about 8 carbon atoms. In another embodiment, the alkyl or alkylene group has at least about 10 carbon atoms. In another embodiment, the alkyl or alkylene group has at least about 12 carbon atoms. In one embodiment, the alkyl or alkylene group has no more than about 60 carbon atoms. In another embodiment, the alkyl or alkylene group has no more than about 50 carbon atoms. In yet another embodiment, the alkyl or alkylene group has no more than about 40 carbon atoms. It will be appreciated, however, that the number of carbon atoms can be outside of these ranges.

In one embodiment, R is an aryl or an arylene group (including substituted and unsubstituted aryl and arylene groups, and wherein heteroatoms, such as oxygen, nitrogen, sulfur, silicon, phosphorus, or the like either may or may not be present in the aryl or arylene group).

In one embodiment, the aryl or arylene group has at least about 5 carbon atoms. In another embodiment, the aryl or arylene group has at least about 6 carbon atoms. In one embodiment, the aryl or arylene group has no more than about 50 carbon atoms. In another embodiment, the aryl or arylene group has no more than about 25 carbon atoms. In yet another embodiment, the aryl or arylene group has no more than about 12 carbon atoms. It will be appreciated, however, that the number of carbon atoms can be outside of these ranges.

In one embodiment, R is an arylalkyl or an arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group).

In one embodiment, the arylalkyl or arylalkylene group has at least about 6 carbon atoms. In another embodiment, the arylalkyl or arylalkylene group has at least about 7 carbon atoms. In one embodiment, the arylalkyl or arylalkylene group has no more than about 60 carbon atoms. In another embodiment, the arylalkyl or arylalkylene group has no more than about 40 carbon atoms. In yet another embodiment, the arylalkyl or arylalkylene group has no more than about 30 carbon atoms. It will be appreciated, however, that the number of carbon atoms can be outside of these ranges.

The substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, or the like, wherein two or more substituents can be joined together to form a ring.

Examples of triisocyanates or their equivalents include triphenyl methane-4,4',4"-triisocynate; Tris(p-isocynatophenyl) thiophosphate; trimethylolpropane trimer of TDI, or the like, isocyanurate trimers of TDI, HDI, IPDI, or the like, and biuret trimers of TDI, HDI, IPDI, or the like, as well as mixtures thereof.

In some embodiments, suitable triisocyanates may be obtained under the name Desmodur® Mondur® or Impranil® for example, Desmodur® N 3300, Desmodur® N 3790, available from Bayer Materials Science, or the like or mixtures thereof.

In some embodiments, the triisocyante is Desmodur® N 3790 is used in the reactant mixture having the structure:

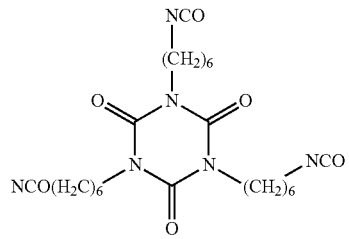

Examples of suitable perfluoropolyether diol compounds comprising an ethyloxylated spacer include (but are not limited to) those of the general formula:

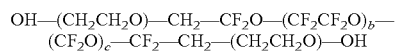

having a molecular weight of about 500 to about 2000 AMU, such as about 1500 AMU, wherein b and c are integers in range between 0 and 50, provided that at least one of b and c are not zero. In some embodiments, suitable perfluoropolyether diol compounds may be obtained under the name Fluorolink® E10H, available from Solvay Solexis.

Suitable reaction conditions for making the fluorinated polyurethane matrix compounds include crosslinking a perfluoropolyether diol compound comprising an ethyoxlated spacer with one or more of the triisocyanates such as Desmodur® 3790 at an elevated temperature, for example, from about 50° C. to about 100° C., such as 71° C. or 72° C., to yield a prepolymer coating solution. In some embodiments, the perfluoropolyether diol compound comprising an ethyoxlated spacer is dissolved in a solvent. A catalyst may be optionally used to produce a perfluoropolyether diol polymer solution, which may be heated before mixing the perfluoropolyether diol compound comprising an ethyoxlated spacer with the triisocyanate.

The perfluoropolyether diol compound comprising the ethyoxlated spacer in some embodiments is more reactive than previous precursors. For example, the perfluoropolyether diol compound comprising the ethyoxlated spacer is structurally different from the precursors used in previous coatings, e.g., Flurorlink®-D, which has the structure $HOCH_2CF_2O(CF_2CF_2O)_b(CF_2O)_cCF_2CH_2OH$, wherein b and c are integers as described herein above. This difference generally leads to higher cross-linking in the present composite. In some embodiments, the mixing of the triisocyanate and the perfluoropolyether diol compound comprising the ethyoxlated spacer involves different synthesis conditions than in previous embodiments of low adhesion coatings, such as different —OH/—NCO molar ratios and reduced optional reaction catalyst amounts.

The reaction may be carried out in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie.

In one embodiment, the reaction conditions can be conducted in an inert atmosphere, such as argon or nitrogen gas or other suitable gases, to prevent oxidizing or yellowing of the reaction products and to prevent undesirable side reactions due to moisture.

The reaction can be performed neat (i.e., without a solvent) or can optionally employ any desired or effective solvent. Examples of suitable solvents include xylene, toluene, benzene, chlorobenzene, hexafluorobenzene, nitrobenzene, dichlorobenzene, N-methylpyrrolidinone, dimethyl formamide, dimethyl sulfoxide, sulfolane, hexane, tetrahydrofuran, butyl acetate, amyl acetate, ethyl acetate, propyl acetate, methyl acetate, Hydrofluoroether (HFE) Novec™ 7200 (3M), HFE 7500 (3M), Solvosol (Dow) and the like, as well as mixtures thereof. Another example of a solvent that may be used is FCL 52 solvent, a fluorinated solvent available from Cytonix LLC.

In one embodiment, the anti-wetting low adhesion coating may be formed on a desired substrate, such as an aperture plate of an aqueous ink jet printhead, by initially applying a reactant mixture that includes at least one triisocyanate and at least one perfluoropolyether diol compound.

The reactants may be reacted together when the perfluoropolyether diol compound comprising an ethyoxlated spacer and the triisocyanates are crosslinked at the elevated temperature described above, e.g. 71° C.-72° C. In some embodiments, the reactant mixture can be further reacted by first curing at a temperature in a range from about 130° C. to about 150° C. for a period of time from about 30 minutes to about 2 hours; followed by a second curing treatment at a temperature in a range from about 250° C. to about 330° C. for a period of time from about 30 minutes to about 2 hours. In one embodiment, the reactant mixture is first cured at a temperature of about 130° C. for about 30 minutes followed by a high temperature at about 290° C. for about 30 minutes.

In some embodiments, the coatings are further subjected to exposure to high temperature and pressure, such as occurs during the fabrication of high density piezoelectric printheads. Examples of such high temperatures are those in a range from about 180° C. to about 325° C., such as about 290° C. Examples of high pressures are those in range from about 100 psi to about 400 psi for extended periods of time, in a range from about 10 minutes to about 2 hours, or high pressures from about 300 psi to about 350 psi for about 30 minutes. In some embodiments, the further exposure to high temperature and pressure results in further curing of the coatings.

In one embodiment, the reactant mixture may be applied to a substrate using any suitable method such as flow coating, die extrusion coating, dip coating, spray coating, spin coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate with a uniform (or substantially uniform) amount of the reactant mixture. The use of a doctor blade is another technique that can be employed to apply the reactant mixture. In flow coating, a programmable dispenser is used to apply the reactant mixture.

Aqueous Ink Jet Printheads and Methods of Manufacture

Figure 2:
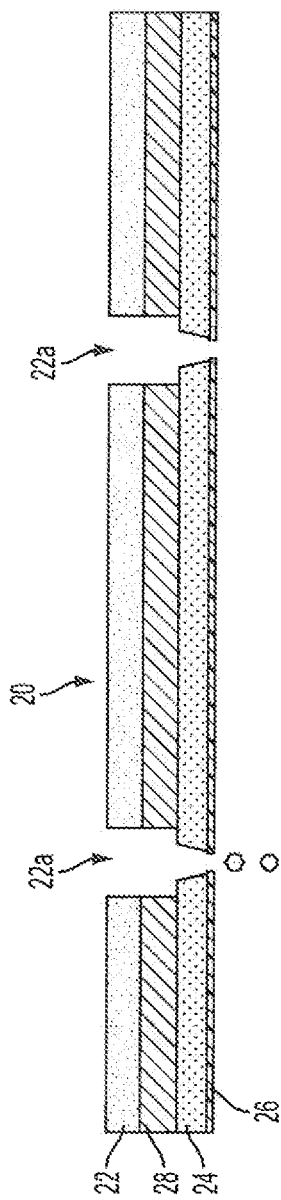
FIG. 2 shows a side view of an embodiment of a jet stack.

In some embodiments, aqueous ink jet printers include arrays of apertures or nozzles on a final plate in a stack of plates used to route aqueous ink. Discussions herein will refer to the stack of plates as the jetstack and the final plate as the nozzle plate. FIG. 2 shows an embodiment of a printhead jet stack having an anti-wetting, low adhesion surface coating 26 bonded to a nozzle plate 24. The nozzle plate may be a polymer film, such as a polyimide film, bonded to an aperture support brace 22. The aperture support brace 22 is formed of any suitable material such as stainless steel and includes apertures 22a defined therein. The apertures 22a may communicate with an aqueous ink source such that aqueous ink from the ink source jets from the printhead jetstack 20 onto a recording substrate through an aperture 22a.

In the illustrated embodiment, the nozzle plate 24 is bonded to the support brace 22 by an intervening adhesive material 28. The adhesive material 28 may be provided as a thermoplastic adhesive, which can be melted during a bonding process to bond the nozzle plate 24 to the support brace 22. Typically, the nozzle plate 24 and the anti-wetting low adhesion coating 26 are also heated during the bonding process. Depending on the material from which the thermoplastic adhesive is formed, bonding temperature can from about 180° C. to about 325° C. (or in a range from about 180° C. to about 325° C., such as about 290° C.).

In some embodiments, the printhead is manufactured by forming a jet stack, coating a nozzle plate with an anti-wetting, low adhesion surface coating as described herein and bonding the nozzle plate to the jet stack. The bonding process may occur before or after the coating process, depending upon the configuration of the jetstack, the nature of the materials used in the coating, etc.

When coated onto the front face of an ink jet printhead, the anti-wetting, low adhesion surface coating as described herein exhibits a sufficiently low adhesion with respect to the aqueous inks that are ejected from the ink jet printhead such that aqueous ink droplets remaining on the anti-wetting, low adhesion surface coating can slide off the printhead in a simple, self-cleaning manner. Contaminants such as dust, paper particles, etc., which are sometimes found on the front face of ink jet printheads, can be carried away from the ink jet printhead front face by a sliding aqueous ink droplet. The anti-wetting, low adhesion printhead front face surface coating can provide a self-cleaning, contamination-free aqueous ink jet printhead.

The aqueous ink jet printheads having the anti-wetting, low adhesion surface coating as described herein may be used with continuous ink jet printers, thermal drop-on-demand (DOD) ink jet printers, and piezoelectric DOD ink jet printers. See also U.S. Pat. No. 8,801,171, herein incorporated by reference in its entirety. As used here, the term "printer" encompasses any apparatus, such as a digital copier, bookmaking machine, facsimile machine, multi-function machine, and the like, which performs a print outputting function for any purpose.

Any suitable recording substrate may be employed with the printers using the aqueous ink jet printheads described herein, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Aqueous Inks

The aqueous inks, which may be used with the coatings, ink jet printheads configured for use with aqueous ink and methods described herein comprise water, colorant and optionally other ingredients such as co-solvents (humectants), surfactants, binders, buffers and biocides. The water acts as a liquid carrier (or medium) for the colorant and optional additives.

The basic components such as the dye or pigment and the aqueous medium that make up the ink composition of the present invention are known per se, and those conventionally used in ink compositions for ink jet recording may be used. For example, the dye may include water-soluble dyes as typified by direct dyes, acid dyes, basic dyes and reactive dyes.

Examples of pigments with coloristic properties useful in aqueous ink jet inks include, but are not limited to: Pigment Blue 15:4; (magenta) Pigment Red 122 Pigment Yellow 14, Pigment Yellow 74, Pigment Orange 5, Pigment Green 1, Pigment Blue 60, Pigment Violet 3, and carbon black, etc.

In conventional ink compositions, dyes are commonly used in such a proportion that the dye holds about 0.1 to 20% by weight in the ink composition. Pigment may also be contained in the ink composition in an amount of 0.1% by weight to 20% by weight based on the total weight of the composition.

The aqueous medium used in the inks used with some embodiments is water, such as deionized water, or a mixture of water and a water-soluble organic solvent. The water-soluble organic solvent used with water may include, for example, lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone. Of these, glycerol, alkylene glycols such as diethylene glycol, and lower alkyl ethers of polyhydric alcohols such as triethylene glycol monoethyl ether may be used in some embodiments.

The water-soluble organic solvent may be contained in the ink composition in an amount of usually from about 0% to about 5% by weight, preferably from about 10% to about 80% by weight, such as from about 20% to 50% by weight, based on the total weight of the ink composition.

When water-soluble organic solvents are used, the content of the water may be determined within a vast range, depending on the type of component of the water-soluble organic solvent, the composition thereof and the desired properties of ink, and may be within the range of usually from about 10% to about 95% by weight, preferably from about 10% to about 70% by weight, and more preferably from about 20% to about 70% by weight, based on the total weight of the ink composition.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5% and more typically in amounts of no more than 2%.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Biocides may be used to inhibit growth of microorganisms in the aqueous inks. The biocides may be anti-microbial agents, anti-fungal agents, etc. Polymers may also be added to the ink to improve durability, or other properties.

Suitable commercial aqueous inks for use with some embodiments of the coatings, printheads and methods described herein include Collins Y, C, M and K dye and pigment inks (Collins Ink jet Corporation, Cincinnati, Ohio) and WBKC Prodigy™ inks (INX Digital International, San Leandro, Calif.) Hunts MICR (Hunt Imaging™, Berea, Ohio) and Arte Belle C pigment ink (American Ink Jet Corporation, Billerica, Mass.

Specific embodiments will now be described in detail. These examples are intended to be illustrative, and the claims are not limited to the materials, conditions, or process parameters set forth in these embodiments.

EXAMPLES

Example 1

Preparation of Coating 38.3 grams of Fluorolink® E10H was added to a 3 neck round bottom flask fitted with an addition funnel, a temperature probe and a condenser. 245 mL of Novec™ 7200, 170 mL of ethyl acetate and 0.333 grams of dibutyltin dilaurate catalyst were added to the 3 neck round bottom flask, and the contents were stirred and heated to a gentle reflux (~71° C.) under a nitrogen atmosphere. A second solution was prepared by dissolving 11.6 grams of Desmodur® 3790 in 445 mL of ethyl acetate and 145 mL of Novec™ 7200. This triisocyanate solution was then transferred to the addition funnel connected to the round bottom flask, and was added dropwise to the Fluorolink® E10H solution over a 2-hour period at 71° C.-72° C. The resulting reactant mixture was stirred overnight (about 18 hours). After cooling to room temperature, the product solution was filtered using a Millipore Opticap® XL filter (pore size 0.2 microns) to yield the product solution. The solid concentration of the product solution was ~4-5%.

The product solution was diluted to ~3.4% solid by adding Novec™ 7200. The diluted solution was transferred to a round bottom flask and it was concentrated to ~12% solid concentration by distillation using a vigreaux distillation apparatus. The final solvent ratio of Novec™ 7200/Ethyl Acetate was about 60/40 (w/w).

The concentrated solution after cooling to room temperature was coated onto a polyimide substrate using a drawbar coater. The coated film was air dried for 5 minutes and then heat-cured in an oven using two sequential curing steps as follows: the air dried film was placed in oven at 130° C. for 30 minutes ($1^{st}$ cure) and then at 290° C. for 30 minutes ($2^{nd}$ cure) to produce the anti-wetting low adhesion coating. Coatings were evaluated for film quality and surface properties towards aqueous inks as described next.

Example 2

Contact Angles and Sliding Angles

Contact angles and sliding angles of the coating prepared according to Example 1 were assessed on an OCA20 goniometer from Dataphysics. In a typical static contact angle measurement, about 10 microliters of aqueous ink were gently deposited on the surface of the Example 1 coating and the static angle was determined by the computer software (SCA20). Each reported datum is an average of >5 independent measurements.

Sliding angle measurement was done by tilting the base unit at a rate of 1°/sec with an about 10 microliter droplet aqueous ink from Collins Ink jet Corporation, Cincinnati, Ohio. The sliding angle is defined as the inclination angle at which the test drops began to slide.

An offline test, so called stacking, was used to simulate adhesive bonding during printhead fabrication. The coating was subjected to a high pressure and high temperature stress, i.e., 290° C. at 350 psi for 30 min and the contact angle and sliding angle afterward were measured.

Table 1, below, depicts the values of the contact angle (CA) and sliding angle (SA) of six samples of the anti-wetting low adhesion aqueous coating according to Example 1 after initial curing and after stacking simulation at 290° C. at 350 psi for 30 min. As is evident from the Table, all of contact angle values were above 40° and the sliding angle values were less than 30° C., even after stacking simulation at 290° C. at 350 psi for 30 min.

TABLE 1

| Sample ID | CA[a] | SA[b] | After Stacking 350 psi/290 C./ 30 min CA | After Stacking 350 psi/290 C./ 30 min SA |
|---|---|---|---|---|
| 1 | 60° C. | 13° C. | 55° C. | 17° C. |
| 2 | 62° C. | 27° C. | 64° C. | 24° C. |
| 3 | 62° C. | 24° C. | 56° C. | 15° C. |
| 4 | 65° C. | 22° C. | 62° C. | 19° C. |
| 5 | 61° C. | 20° C. | 58° C. | 16° C. |
| 6 | 62° C. | 18° C. | 60° C. | 28° C. |

[a]CA refers to Contact Angle
[b]SA refers to Sliding Angle

Figure 3:
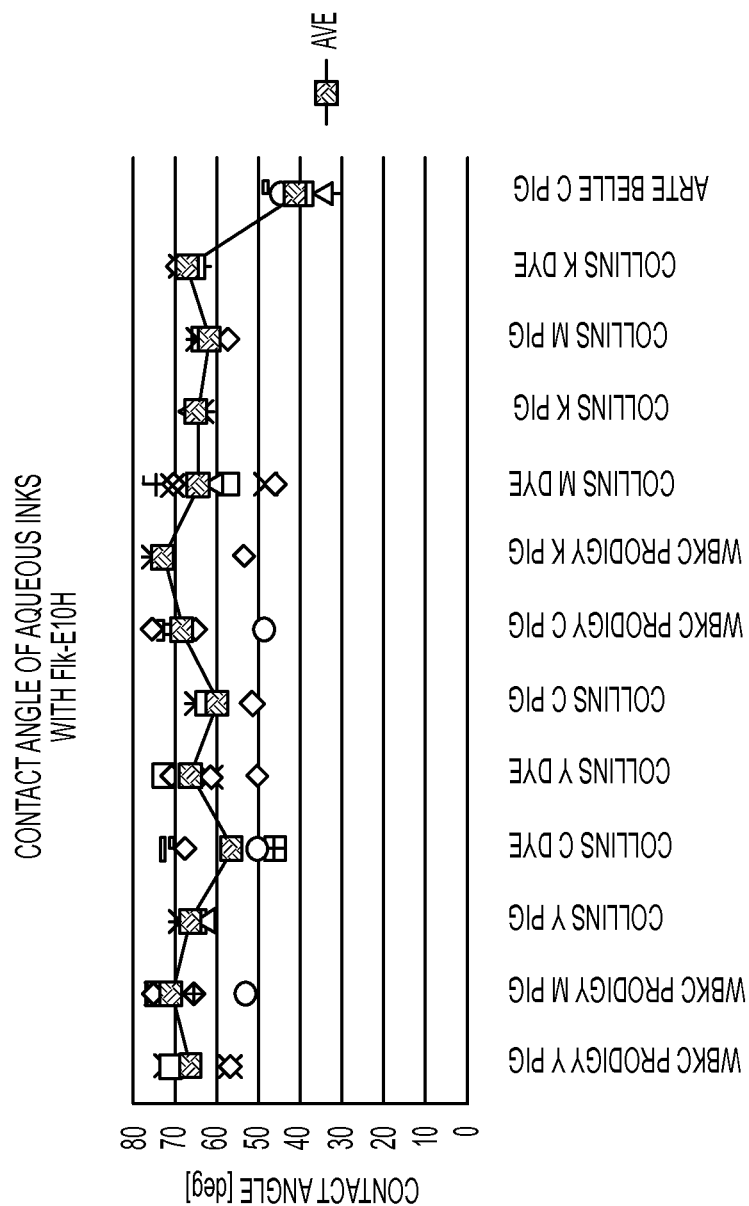
FIG. 3 depicts contact angles using commercially available aqueous inks

The anti-wetting low adhesion coating described in Example 1 was also tested with thirteen commercial aqueous inks and the coating angles were evaluated. As shown in FIG. 3, all of the commercial inks exhibited contact angles greater than 40° C. on average. Collins Y, C, M and K dye and pigment inks (Collins Ink jet Corporation, Cincinnati, Ohio) and WBKC Prodigy™ inks (INX Digital International, San Leandro, Calif.) resulted in higher contact angles than Arte Belle C pigment ink (American Ink Jet Corporation, Billerica, Mass.).

Example 3

Contact and Sliding Angles of Aqueous Inks after Head Build

Printheads were fabricated as follows. A polyimide aperture assembly depicted in FIG. 2 was fabricated by coating the low adhesion anti-wetting coating 26 as described in Example 1 onto the outer surface of an aperture plate 24 manufactured from the polyimide film Upilex®, available from Ube Industries. The stainless steel aperture brace 22 was bonded to the aperture plate (coated polyimide film) using a high temperature, thermoplastic adhesive, i.e., a thermoplastic polyimide film from DuPont® ELJ-100 at 290° C. under 350 psi for half an hour. A laser was used to ablate the nozzles in the aperture plate. The resulting polyimide aperture assembly was then attached and bonded to a jet stack/PZT assembly and manifold, resulting in a printhead.

The contact angle (CA) and sliding angle (SA) of commercially available aqueous inks was assessed before the head build as described above in Example 2 and after the head build. During the stack bond, a fluropolymer (PFA) was placed over the apertures for protection. The results are depicted in FIG. 4.

Figure 4:
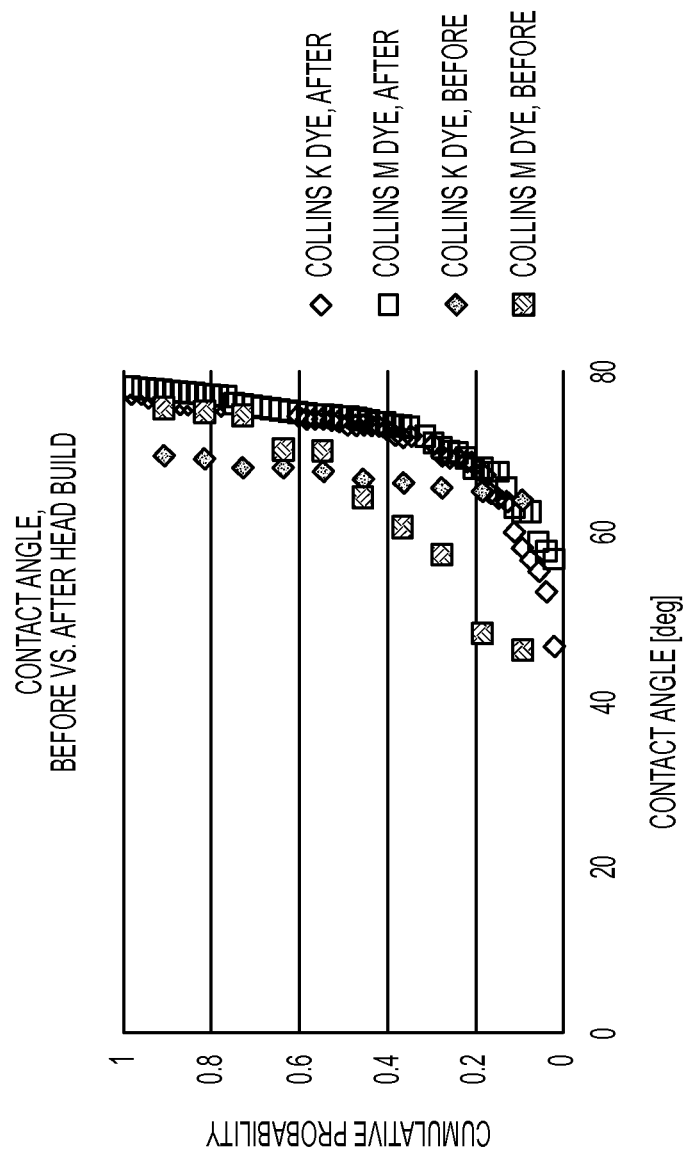
FIG. 4 depicts the cumulative probability versus contact angle before and after a print head build.

FIG. 4 depicts the cumulative probability versus the contact angle for the specified Collins dye before and after the head build.

Example 4

Drooling Pressure

Figure 5:
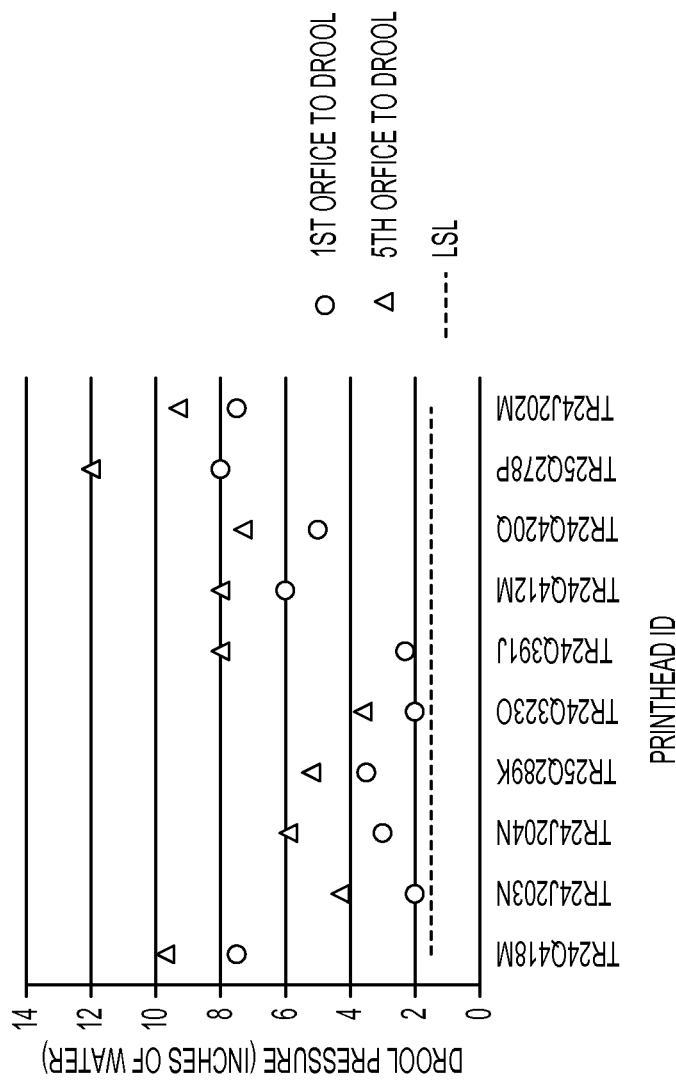
FIG. 5 depicts drool pressure of several printheads with coated front face using commercially available aqueous ink.

Prototype printheads fabricated according to Example 3 using the coatings prepared according to Example 1 also exhibited good drool performance. Drool pressure was measured with a model number DPIS8 pressure transducer available from Omega Engineering, Inc. (Stamford, Conn.) and calibrated against a manometer. FIG. 5 shows drool pressure of several printheads built using E10H coatings. As can be seen from FIG. 5 the drool pressure was maintained above the lower spec value of 1.5 inches of water for all the printheads made using E10H coatings.

Example 5

Ink-fouling and Surface Recovery

Figure 6:
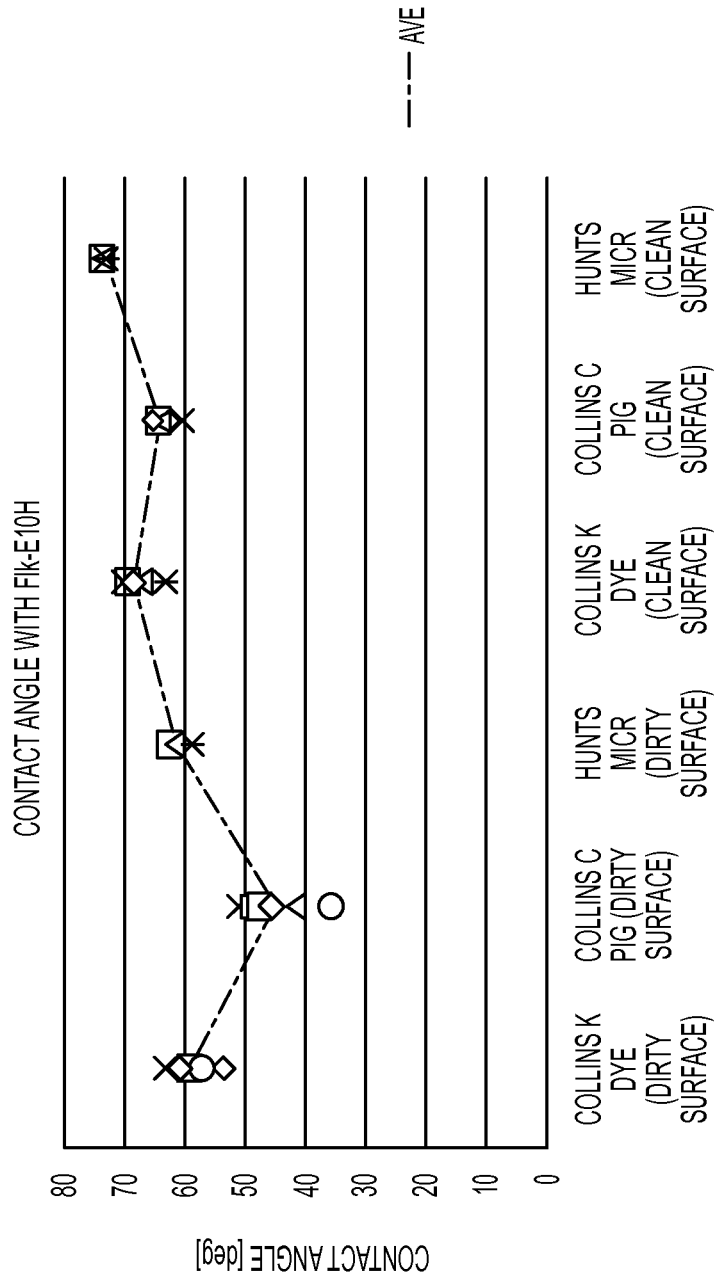
FIG. 6 depicts the contact angles of aqueous inks on clean and fouled surface coatings.

The differences in contact angle between dirty and clean surfaces were assessed by soaking the coating surface of printheads with aqueous ink and allowing the ink to dry. FIG. 6 demonstrates that the average contact angles for aqueous dyes (Collins dye, Collins pigment, INX Pigment and Hunts MICR) are greater than 40° C. even when the surface contained dried aqueous ink.

Figure 7:
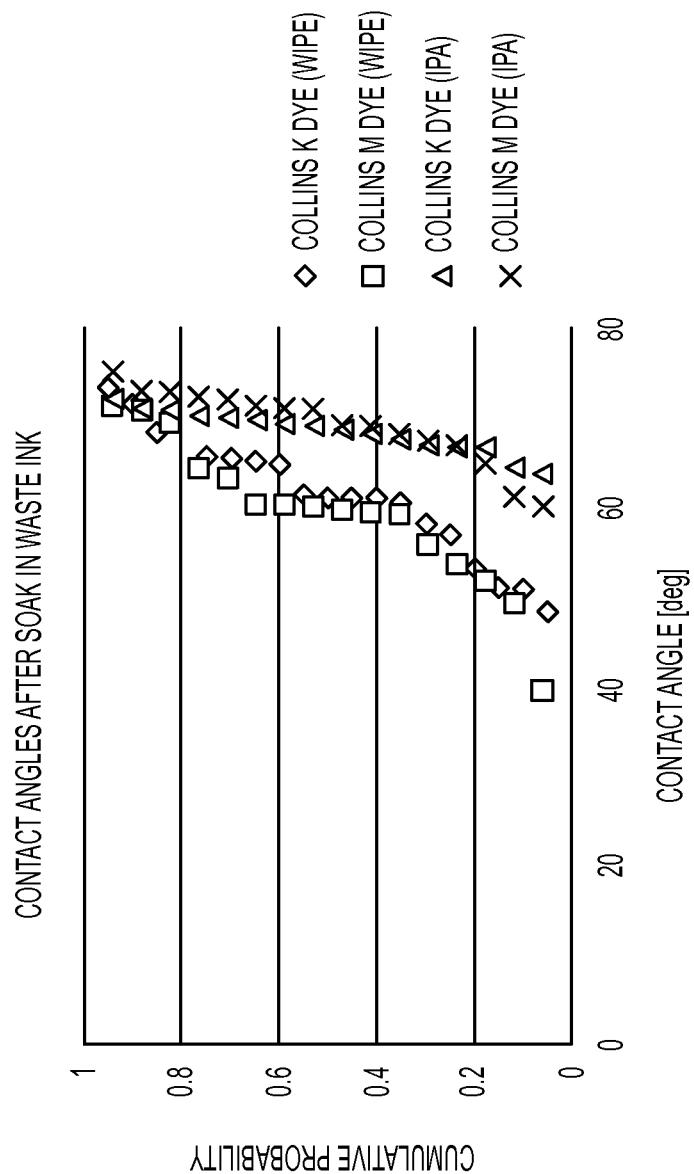
FIG. 7 depicts the cumulative probability versus contact angle after a surface coated aperture plate is soaked in waste aqueous ink followed by different surface cleaning methods.

In addition, the coating surfaces of the printheads were soaked in aqueous waste ink (Collins Dye, 4 colors mixed) for 49 days. The contact angles of aqueous ink on the surfaces were measured, indicating different degrees of ink-fouling or ink-contamination on the surfaces. FIG. 7 shows that the aqueous ink contact angle on the nozzle plate decreased when soaked in the aqueous ink, indicating that the surface had been fouled by the ink. The contact angles were measured after wiping the ink and after cleaning with Isopropanol alcohol (IPA). Cleaning with IPA resulted in contact angles back to the initial distribution.

Figure 8:
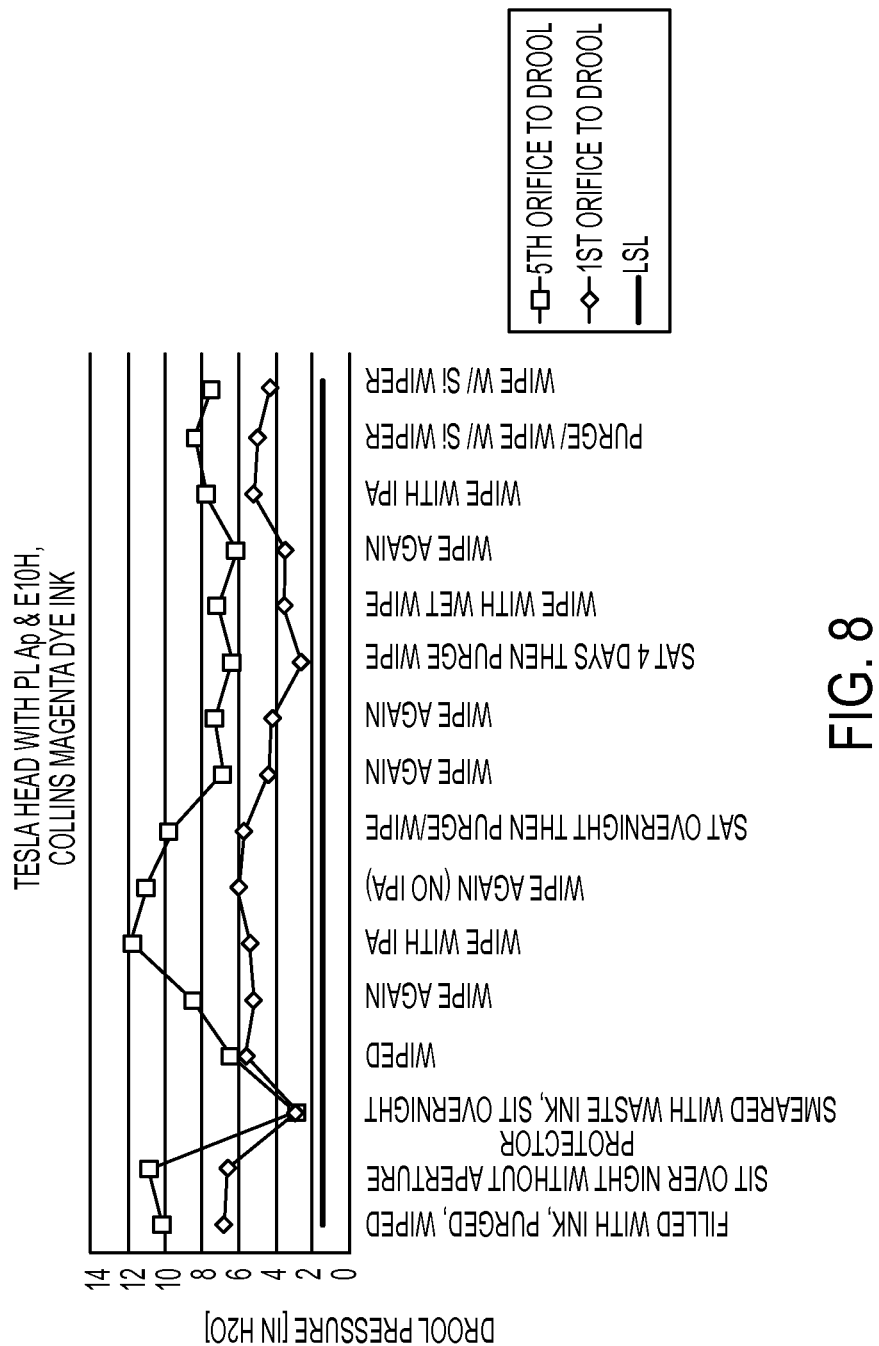
FIG. 8 depicts the drool pressures of aqueous ink jet printheads with a surface coated front face under different fouling and cleaning conditions.

Drooling pressure was also maintained above the lower spec value of 1.5 inches of water after the printheads were smeared with waste ink (Collins Magenta Dye Ink) and allowed to sit overnight and dry. Removing the ink by wiping and/or purging improved the drool pressure (FIG. 8).

Figure 9:
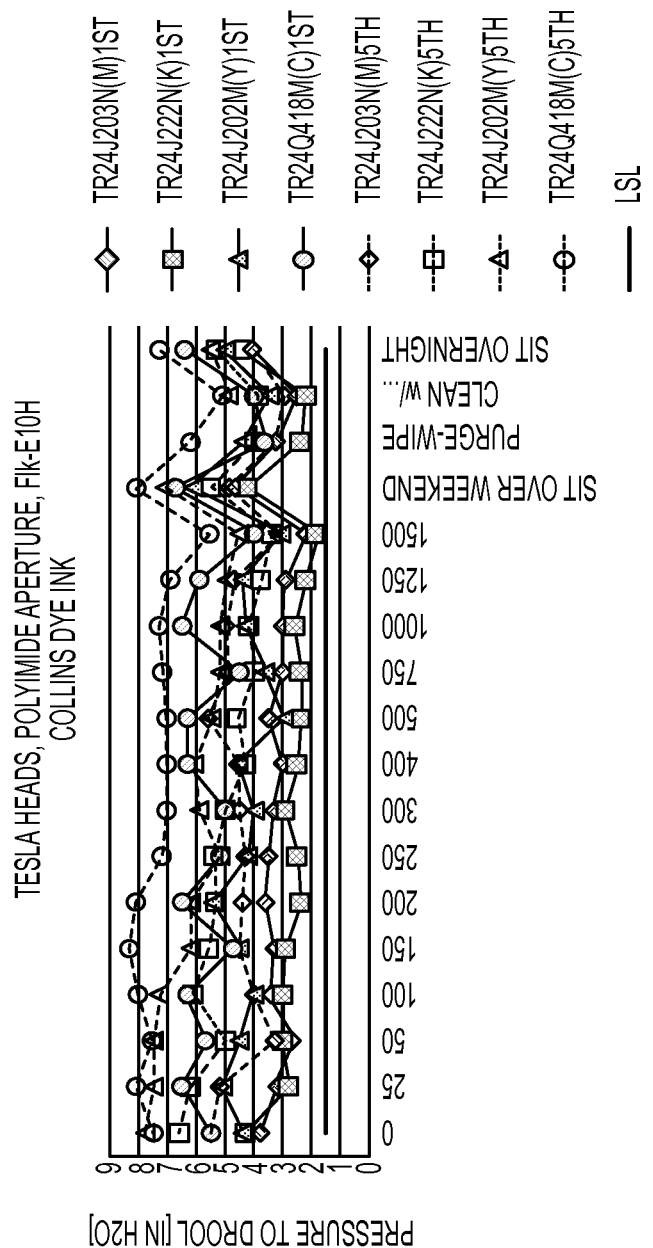
FIG. 9 depicts the drool pressures of aqueous ink jet printheads with a surface coated front face after purge wipe cycles.

To assess the robustness of the coating according to Example 1 after many wiping cycles, the coating was subjected to >1500 purge wipe cycles using a silicone wiper. As depicted in FIG. 9, the drool pressure was maintained above the lower spec value of 1.5 inches even after 1500 purge wipe cycles. Further, FIG. 9 demonstrates that sitting with the surface clean improves drool performance.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

The invention claimed is:

1. An ink jet printhead configured for ejecting aqueous ink comprising:
   a front face having disposed on a surface thereof an anti-wetting, low adhesion coating, wherein the low adhesion coating is a reaction product of a reactant mixture comprising a perfluoropolyether diol compound comprising an ethyoxylated spacer and a triisocyanante,
   wherein a jetted drop of aqueous ink exhibits a low sliding angle and a high contact angle with the printhead front face surface comprising the coating, wherein the low sliding angle is less than about 30° and the contact angle is greater than about 40°, wherein the ink jet printhead comprises aqueous ink and wherein the aqueous ink comprises a surfactant,
   wherein the low adhesion coating maintains the average contact angle of greater than 40° with the aqueous ink after being fouled by dried aqueous ink.

2. The ink jet printhead of claim 1, wherein the front face comprises a nozzle plate comprising stainless steel or polyimide.

3. The ink jet printhead of claim 2, wherein the nozzle plate comprises polyimide.

4. The ink jet printhead of claim 1, wherein the contact angle is greater than about 55° C. and wherein the sliding angle is less than about 20° C.

5. The ink jet printhead of claim 2, wherein a drool pressure is maintained above 1.5 inches of water.

6. The ink jet printhead of claim 1, wherein the printhead is a piezoelectric printhead.

* * * * *